Oct. 31, 1967     E. A. GLASSEY     3,349,622
BAROMETER CONSTRUCTION
Filed Dec. 7, 1964     2 Sheets-Sheet 1
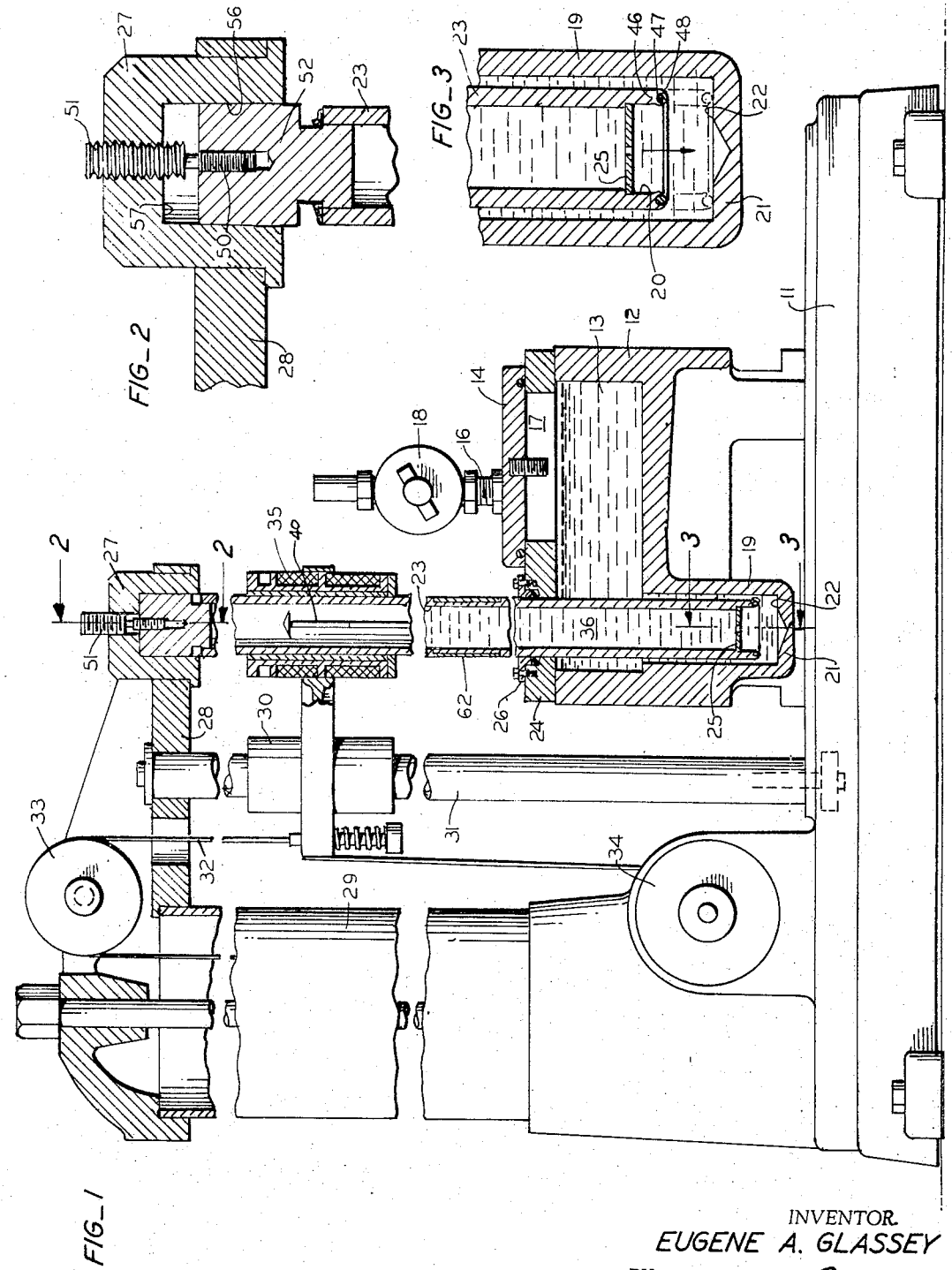
INVENTOR.
EUGENE A. GLASSEY
BY Julian Caplan
ATTORNEY Oct. 31, 1967  E. A. GLASSEY  3,349,622
BAROMETER CONSTRUCTION
Filed Dec. 7, 1964  2 Sheets-Sheet 2
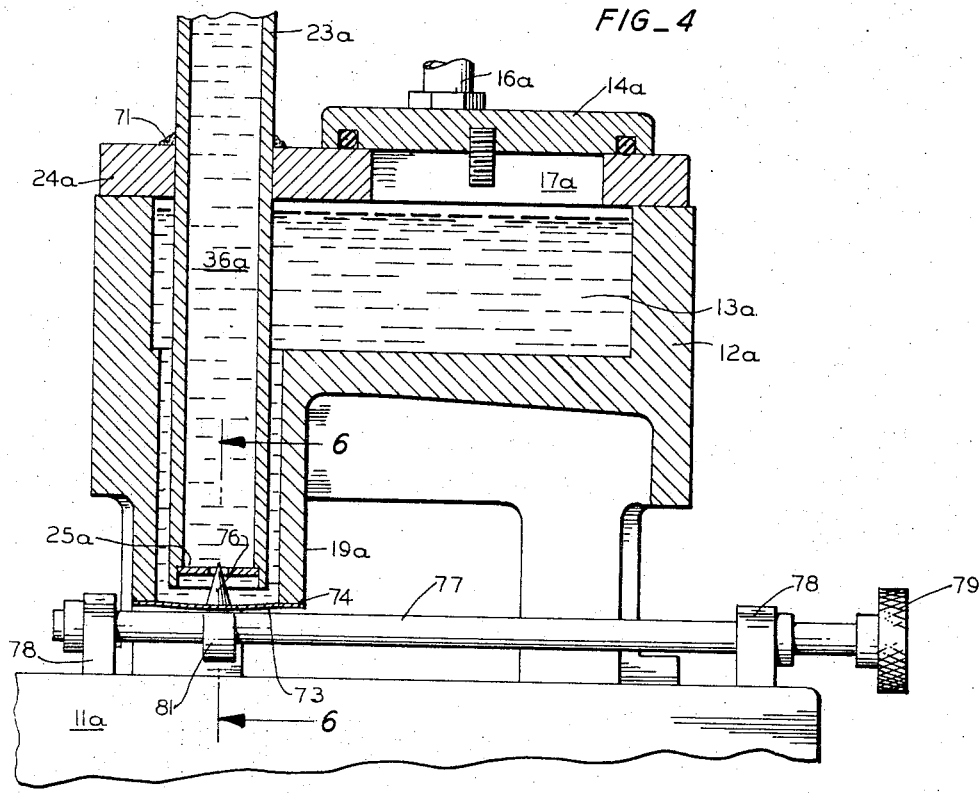
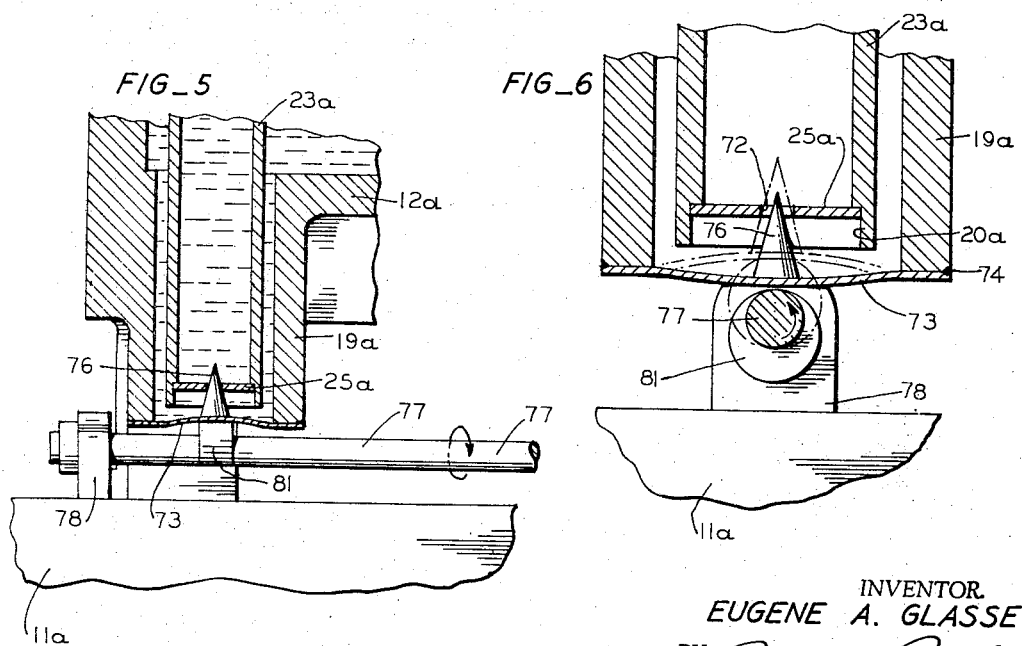
INVENTOR.
EUGENE A. GLASSEY
BY Julian Caplan
ATTORNEY

United States Patent Office 3,349,622
Patented Oct. 31, 1967

3,349,622
BAROMETER CONSTRUCTION
Eugene A. Glassey, Los Altos, Calif., assignor to Exactel Instrument Company, Mountain View, Calif.
Filed Dec. 7, 1964, Ser. No. 416,562
10 Claims. (Cl. 73—385)

This invention relates to a new and improved tube and cistern construction for a precision meteorological atmospheric pressure barometer of the type shown in U.S. Patent No. 3,043,144. The construction is intended principally to fill needs in the aeronautical and meteorological fields, such as airport, meteorological and weather station barometers. Instruments of this general classification have a vertical tube projecting upward from a cistern which is in communication with the atmosphere or a vessel under test. Such tube is closed at the top and partially filled with mercury, or other suitable liquid, with vacuum above. The present invention comprises improvements in the construction of such tube and cistern assemblies.

Customarily, a barometer of the type shown in Patent No. 3,043,144 is filled with mercury at the factory under carefully controlled conditions, as by distillation under vacuum, to prevent moisture, air, or other contaminants from entering the tube. The shipping of this type of mercurial barometer always has posed a problem, because of its fragility and the possibility of losing the reference vacuum at the top of the tube, as may be caused by tipping or sloshing of the mercury back and forth between cistern and tube, since moisture, air and contaminants can be transferred between cistern and tube by mechanical agitation. The present invention provides means whereby the evacuated space may be sealed off during transportation to preserve the reference vacua and avoid transfer of all contaminating substances.

A further feature of the invention resides in the construction of the tube itself. Heretofore, mercurial meteorological barometers have generally been of glass. In a preferred form of the persent invention, the tube is formed of stainless steel of a non-magnetic characteristic, the upper end of the tube being closed by a completely non-porous seal which will maintain its sealing characteristics permanently. Current state of the art sealing methods, as by Heliarc welding, permit this practice with suitable materials, the same as with glass.

A principal problem long associated with digital barometers of the type described herein is field "zeroing" or proper synchronizing of digital encoders so that the digital value supplied from the encoder is accurately representative of atmospheric pressure. It has been general practice, in meteorology, to employ a transfer standard of suitable type to set the numerical reading of the barometer at the time of installation, whenever serviced and perhaps at periodic intervals. It is a tedious, costly and time-consuming matter to check a barometer by this process, particularly when it is at a remote locality. To reduce, and perhaps eliminate, dependence upon such transfer standards, the barometer construction of the subject invention incorporates a reference to be hereafter referred to as an "index sensor." The index sensor consists of a band of magnetic material inlaid annularly around the barometer tube at a vertical position corresponding to roughly 20″ Hg reading (in the usual case) and somewhat below the region of lowest barometric pressure to be encountered.

By an appropriate operation of controls on the servo-amplifier the differential transformer that normally senses the float atop the mercury column in the tube may be driven from the float and caused to servo-position upon the index sensor.

As a final stage of factory calibration of the barometer the servo is positioned to the index sensor and the corresponding digital value as supplied by the mechanical counter or digital encoder (for example 20.397″ Hg) is recorded on a plate affixed to the instrument. The temperature compensator described in Patent No. 3,043,144 is made inoperative during this step. This reproducible value then serves as a discrete reference check point of the synchronization following shipment, routine inspection or repair.

Barometers of the subject type are intended largely for use in unattended weather stations to transmit or record barometric data automatically or upon interrogation. As such, they are equipped with digital encoders and other suitable apparatus. To illustrate the practical utility of the index sensor, assume repair or replacement of digital apparatus is required. With use of the index sensor it is a simple matter to disengage any or all portions of the servo transmission, effect repairs and replace the barometer in service without the use of transfer standards.

An additional advantage of the index sensor is in checking the accuracy of the replacement of the tube in upward position after it has been depressed to seal the tube from the cistern during transportation. Ordinarily, the tube is butted against the reference surface for such purpose, but there may be inaccuracy in the relocation of the tube due to a burr on the end of the tube, dirt, or other foreign material between the end of the tube and said reference surface. If for any reason the re-elevation of the tube after shipment results in a shift in the position of the tube as compared with its original position, the cause may be ascertained and corrected. The persent invention thus makes possible the checking of the instrument to reset same accurately.

A further advantage of the present invention is the fact that the tube construction makes possible the fabrication of a non-porous seal of a plug in the upper end of a tube of the character described. Heretofore, no metal meteorological barometer tube has been produced partially because it was difficult to provide an end closure which was perfectly non-porous. The present invention provides a construction which permits such perfect end closure.

Still another feature of the invention is the fact that a stainless steel tube having numerous advantages over other material, is provided. Until recent years, welding of stainless steel to produce a non-porous seal was not possible. Further, sealing means such as solder, brazing alloys, and the like, are not compatible with mercury.

The term "barometer" as used herein means an instrument to measure atmospheric pressure without continuous pumping of the end of the tube.

Other objects of the present invention will become apparent upon reading the following specification and referring to the accompanying drawings in which similar characters of reference represent corresponding parts in each of the several views.

In the drawings:

FIG. 1 is a schematic view of an instrument in accordance with the present invention broken away to conserve space.

FIGS. 2 and 3 are enlarged fragmentary, sectional views taken substantially along the lines 2—2 and 3—3, respectively, of FIG. 1.

FIG. 4 is a fragmentary sectional view of a cistern and tube of a modification.

FIG. 5 is a view of a portion of FIG. 4 showing the parts in a different position of adjustment.

FIG. 6 is an enlarged fragmentary section taken substantially along line 6—6 of FIG. 4.

The accompanying drawings illustrate a modification of the atmospheric pressure barometer shown in Patent No. 3,043,144. In the form of the invention shown in FIGS. 1–3, a base 11 supports cistern 12 containing a liquid 13, usually mercury, and having a lid 14 sealed thereto with a conduit 16 communicating with the space 17 above the liquid level of the cistern 12 and either with the atmosphere or with an enclosure under test. Valve 18 enables a vacuum to be drawn and held in cistern 12 during transportation. A well 19 is disposed at one side of cistern 12 having a bottom 21 which is finished as indicated by reference numeral 22 with a smooth surface.

Supported extending above cistern 12 and in communication with well 19 is barometer tube 23 having its lower end extending into well 19 and its upper end extending up through top 24 through a packing gland 26. To dampen surge of liquid into and from tube 23, a reduced diameter annular plug 25 with but a small opening to dampen response may be inserted near the lower end of tube 23, which is made of increased inside diameter, as indicated by reference numeral 20, to receive plug 25. Tube 23 may be of various materials, but for the purpose of proper operation of a device shown in Patent No. 3,043,144 must be non-magnetic and compatible with the barometer liquid employed. Heretofore, most such tubes have been of glass, but in accordance with present invention a stainless steel tube is used. The upper end of tube 23 is received in guide and stop assembly 27 supported by arm 28 projecting from column 29 which rests on base 11. Guide bar or rod 31 extends between base 11 and arm 28 in parallel alignment with tube 23. Slidable along rod 31 is carriage 30 supporting differential transformer 35 surrounding tube 23. The connector element 30 is positioned by a perforated metal tape 32 which extends around top pulley 33 on arm 28, down through column 29 and around a bottom pulley (not shown) which is connected by a gear train to servomotor 34 which is electrically-connected to differential transformer 35 in a manner and for a purpose described in said Patent No. 3,043,144. The details of the electrical system and the connection between the transformer and the tape do not form an essential part of this invention. Well 19 permits the float (not shown) to which armature 40 is attached to be lowered so that armature 40 and transformer 35 are located at the zero point of the instrument.

From the foregoing description it is apparent that the space 17 above the level of liquid 13 in cistern 12 may carry contaminating substances, whereas the liquid 36 inside tube 23 must be free from air, moisture or any other contaminant. At the factory, the tube 23 and cistern 12 in assembled condition have heretofore been heated in an oven and evacuated. Mercury is then distilled under vacuum in a still and condensed and allowed to flow into the cistern and tube. It is essential for proper operation of the instrument that the vacuum in the tube be maintained during transportation and use. However, oscillatory movement during transportation tends to cause the mercury in the cistern to surge and slosh between cistern and tube and occasionally to carry contaminants, moisture and air into the tube which degrade the reference vacuum. The present invention provides a means to prevent such degradation. Accordingly, the tube 23 is vertically slidable relative to gland 26. In normal position of use, as illustrated in FIG. 1 and in the solid lines of FIG. 3, the bottom end of tube 23 is spaced above surface 22. However, means is provided to force the bottom of tube 23 downwardly to surface 22 and thus seal the tube from the cistern 12 during transportation. To improve the seal, a groove 46 is formed in the bottom end of tube 23 and a ring 47 of resilient material is installed in the groove 46 with its bottom edge projecting therefrom. To maintain ring 47 in groove 46 the edges of the groove 46 may be spun or rolled over as indicated by reference numeral 48. Accordingly, when the tube 23 is forced down, the ring 47 seals to end surface 22 and prevents communication between the interior of tube 23 and cistern 12.

In order to force the tube 23 downward, a differential screw 51 is threaded into and projects from fitting 27. The lower end 50 of screw 51 is formed of lesser diameter and finer threads than the upper end. Cap 52 on the upper end of tube 23 is threaded to receive lower end 50 of screw 51. By turning differential screw 51, tube 23 may be moved vertically, the axial movement of tube 23 being less than screw 51 because of the difference in threads. Further, by reason of the construction heretofore described, when the screw 51 is reversed in direction the tube is drawn upwardly to re-establish communication of the liquid between the column 36 inside tube 23 and the liquid 13 in cistern 12. The fitting 27 is formed with a recess 56 to receive the upper end of tube 23 and cap 52 and has a locating surface 57 at its top which accurately limits upward movement of tube 23 to the desired position.

Heretofore, tubes 23 for this purpose have customarily been made of glass and glass tubes inherently are subject to damage in transportation and use. Further, in case of breakage of the glass there is a hazard to health and a danger to surrounding components from spilled mercury. The tube 23 may be formed of stainless steel in accordance with this invention and the cap 52 welded to the upper end of the tube by Heliarc welding which completely closes the upper end of tube 23 with a non-porous seal which is permanent.

It is occasionally necessary to check the synchronization of the instrument shown in Patent No. 3,043,144 by a reference point. For example, occasionally the system requires mechanical repair or there is a failure in the digitizing apparatus. It is thereupon necessary to restore the instrument to its original calibration point as established at the factory. For such purpose, a groove 61 is formed around the outside of tube 23 in a position which is outside but near the normal operating range of use of the instrument. A band 62 of magnetic material is inserted in groove 61 so that its exterior is substantially continuous with the exterior of tube 23. The electrical center of band 62 is established as a calibration point for the instrument at the time of its original shipment from the factory. When it is desirable or necessary to check the instrument, the differential transformer 35 is driven to the region of band 62 through the use of electrical controls provided for this purpose. The servo may be made to balance with the differential transformer electrically centered on the band 62 just as it normally centers the differential transformer on the magnetic armature 60 of Patent No. 3,043,-144. A reading then is obtained from the digitizing apparatus of the instrument and such reading is compared with the initial reading as calibrated at the factory. If the two readings are identical, then the synchronization of the setting is proven. If necessary, the digital readout is resynchronized to yield the correct digital value. After the check (and adjustment, if necessary) have been made, the differential transformer is returned to balance upon the float, by the control provided, and the instrument may then be used for its normal purpose.

It will be understood that the magnetic band 62 may be applied to tube 23 in a variety of ways as, for example, by painting with magnetic paint or welding.

For shipping purposes, screw 51 is driven downwardly to force the bottom of tube 23 against surface 22 with ring 47 interposed to seal off the bottom of the tube. This prevents transfer of mercury or foreign matter between cistern and tube. The cistern 12 is then preferably evacuated through valve 18. When it is desired to place the instrument in service, screw 51 is turned in the opposite direction to slide tube 23 upwards until the top of cap 52 seats against surface 47 in fitting 27. If necessary during the movement of tube 23 the packing gland 26 may be loosened and then tightened after the tube is positioned.

It will be understood the closing of the lower end of the tube by sliding the tube downward as described involves the principle of a valve in the channel of communication of the mercury between tube and cistern. It is evident any of many valving arrangements to accomplish this purpose are possible. A modified means of accomplishing a similar result is shown in FIGS. 4–6. Many of the parts are similar to the preceding modification and the same reference numerals are employed, followed by the subscript *a*.

In this form of the invention, tube 23*a* is fixed relative to top 24*a* as by weld 71, thus eliminating gland 26. Plug 25*a* is located adjacent the lower end of tube 23*a* and its central aperture 72 serves as a valve seat. The bottom of well 19*a* is closed off by a flexible metal diaphragm 73 and weld 74, or equivalent sealing means. Valve closure 76, here shown as a cone, cooperates with seat 72 to close off communication between cistern 12*a* and tube 23*a*. When diaphragm 73 is relaxed (as in FIG. 4 and the solid line position of FIG. 6), the valve is open. When diaphragm 73 is forced upward (FIG. 5 and dotted line position of FIG. 6) cone 76 closes opening 72 and communication with the inside of the tube is closed off.

One means for distorting diaphragm 73 is illustrated herein, but various other means may be used. Cam shaft 77 is mounted by bearings 78 on base 11*a*. Cam 81 on shaft 77 is positioned under well 19*a* and is rotated by knob 79. When cam 81 is in the position shown in solid lines in FIG. 6, it is out of contact with diaphragm 73, but when turned 180° to the dotted line position it forces diaphragm 73 upward and closes the valve.

Although the foregoing invention has been described in some detail, by way of illustration and example for purposes of clarity of understanding, it is understood that certain changes and modifications may be practiced within the spirit of the invention and scope of the appended claims.

What is claimed is:

1. In a barometer, a cistern, a pressure inlet for said cistern, a tube extending up from said cistern, a pressure responsive medium in said cistern and tube, means for reading out the elevation of said medium in said tube, a support for said tube, and sealing means interposed between the lower end of said tube and said cistern to seal off communication between said tube and said cistern, said tube slidable in said support toward and away from said cistern, said sealing means comprising a resilient member adapted to seal between said lower end of said tube and said cistern when said tube is moved against said cistern.

2. A barometer according to claim 1, in which the lower end of said tube is formed with an annular groove and said sealing means comprises a resilient ring partially received in said groove.

3. A barometer according to claim 1, which further comprises means engageable with said tube for moving said tube in at least one axial direction.

4. A barometer according to claim 1, which further comprises cooperative means in said tube and said support for moving said tube in at least one axial direction.

5. A barometer according to claim 4, in which said cooperative means comprises a screw threaded through said support and engageable with the upper end of said tube.

6. A barometer according to claim 5, in which the upper end of said tube is formed with a cap and said cap is formed to receive said screw.

7. A barometer according to claim 5, in which said tube is formed of stainless steel and which further comprises a stainless steel cap hermetically closing off the upper end of said tube and welded thereto, said cap formed to receive said screw.

8. A barometer according to claim 1, in which said tube is of non-magnetic material and is formed with a relatively narrow external circumferential band of magnetic material, said barometer also comprising a differential transformer movable along said tube and actuating means to electrically center said transformer relative to said band.

9. In a barometer, a cistern, a pressure inlet for said cistern, a non-magnetic tube extending up from said cistern formed with a relatively narrow, stationary, external circumferential band of magnetic material, a pressure responsive medium in said cistern and tube, an armature supported by said medium, said barometer also comprising a differential transformer movable along said tube and responsive to the position of said armature and actuating means to electrically center said transformer relative to said band, and readout means indicating the position of said transformer.

10. A barometer according to claim 9, in which said tube is formed with an external circumferential groove and said band is recessed into said circumferential groove.

References Cited

UNITED STATES PATENTS

| | | | |
|---|---|---|---|
| 32,836 | 7/1861 | Large | 73—385 |
| 36,872 | 11/1862 | Timby | 73—385 |
| 784,986 | 3/1905 | Chaney | 73—385 |
| 805,743 | 11/1905 | McConnell | 73—385 |
| 1,007,393 | 10/1911 | Schneible | 251—350 |
| 3,043,144 | 7/1962 | Glassey | 73—401 |

FOREIGN PATENTS 395,153    7/1933    Great Britain.

OTHER REFERENCES

Exactel Servomanometers, Bulletin 500–1959, edition by Exactel Instrument Co., 5545 Eva Ave., Los Altos, Calif. (7 pages).

LOUIS R. PRINCE, *Primary Examiner.*

D. O. WOODIEL, *Assistant Examiner.*